United States Patent
Zhang (10) Patent No.: US 9,955,448 B2
(45) Date of Patent: Apr. 24, 2018

(54) CONTROL METHOD AND ELECTRONIC DEVICE

(71) Applicant: Lenovo (Beijing) Limited, Beijing (CN)

(72) Inventor: Jing Zhang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 0 days.

(21) Appl. No.: 15/068,041

(22) Filed: Mar. 11, 2016

(65) Prior Publication Data

US 2017/0150472 A1    May 25, 2017

(30) Foreign Application Priority Data

Nov. 23, 2015   (CN) .......................... 2015 1 0816446

(51) Int. Cl.
*H04W 48/02* (2009.01)
*H04W 60/06* (2009.01)
*H04W 8/20* (2009.01)

(52) U.S. Cl.
CPC .......... *H04W 60/06* (2013.01); *H04W 8/205* (2013.01)

(58) Field of Classification Search
CPC ..... H04W 84/045; H04W 12/08; H04W 8/16; H04W 48/02; H04W 84/042; H04W 84/105; H04W 12/06; H04W 60/02; H04L 12/1836; H04L 12/189; H04L 63/108

See application file for complete search history.

(56) References Cited

U.S. PATENT DOCUMENTS

| | | | | |
|---|---|---|---|---|
| 2007/0258369 | A1* | 11/2007 | Yamashima | H04L 41/082 370/230 |
| 2009/0265543 | A1* | 10/2009 | Khetawat | H04W 12/08 713/151 |
| 2012/0165013 | A1* | 6/2012 | Nishida | H04W 76/068 455/435.1 |
| 2015/0140967 | A1* | 5/2015 | Leu | H04L 63/101 455/411 |
| 2015/0173103 | A1* | 6/2015 | Lunden | H04L 67/1097 370/331 |
| 2015/0264139 | A1* | 9/2015 | Son | H04L 67/125 709/208 |
| 2016/0124401 | A1* | 5/2016 | Li | G05B 15/02 700/275 |

\* cited by examiner

*Primary Examiner* — Quan M Hua
(74) *Attorney, Agent, or Firm* — Ference & Associates LLC (57) ABSTRACT

Disclosed is a control method and electronic device, where the method includes: acquiring subscriber identification information sent by a second electronic device, where the subscriber identification information is identification information registered by the second electronic device at a network side; based on the acquired subscriber identification information, registering at the network side through a second communication connection; and detecting a connection state of a first communication connection to the second electronic device, where if the first communication connection to the second electronic device is detected to meet a first predetermined condition, sending a log-off request to the network side through the second communication connection to enable the second electronic device to perform a registration operation based on the subscriber identification information.

15 Claims, 8 Drawing Sheets

CONTROL METHOD AND ELECTRONIC DEVICE

CLAIM FOR PRIORITY

This application claims priority to Chinese Application No. 201510816446.6, filed on Nov. 23, 2015, which is fully incorporated by reference herein.

FIELD

The subject matter described herein relates to a connection management control for a terminal device, more specifically, it relates to a control method and an electronic device.

BACKGROUND

By means of a current virtual subscriber identify module (SIM) card technology, two devices can share the services of a single SIM card, i.e., virtual SIM card functions, via short-range wireless transmission technology such as BLUETOOTH. (BLUETOOTH is a registered trademark of Bluetooth SIG, Inc. in the United States and other countries.) Due to a limited coverage of the short-range wireless communication technology, the short-range wireless communication method cannot keep two devices in communication when a distance therebetween exceeds the wireless communication range or when interference or shielding that results in signal loss or instability is present. In this case, after leaving the electronic device without a physical SIM card installed thereon, a user might not be able to use the functions of mobile network services on the electronic device with a SIM card installed thereon, because the electronic device without a physical SIM card installed thereon still registers at a network side, and the electronic device with a SIM card installed thereon cannot register at the network side in a timely manner.

BRIEF SUMMARY

In summary, one aspect provides an electronic device, comprising: a processor; and a transceiver coupled to the processor, wherein the transceiver receives subscriber identification information from another electronic device, and sending said subscriber identification information to a network in order to register the another electronic device with the network, and wherein, after detecting that the electronic device is no longer connected to the another electronic device, the processor instructs the transceiver to send a log-off request to the network to deregister the another electronic device from the network, so as to cause the another electronic device to re-register with the network.

Another aspect provides an electronic device, comprising: a processor; and a transceiver coupled to the processor, wherein the transceiver sends a subscriber identification to a network in order to register the electronic device with the network, wherein in response to receiving a log-off request from the network to deregister the electronic device from the network, the processor causes the electronic device to re-register with the network.

A further aspect provides a control method comprising: connecting a first electronic device with a second electronic device to facilitate data transfer, wherein the second electronic device has registered subscriber identification information with a network; receiving, at the first electronic device, said subscriber identification information from the second electronic device; sending, using the first electronic device, said subscriber identification information to the network to register the first electronic device with the network; and in response to detecting that the second electronic device is no longer connected to the first electronic device, sending, using the first electronic device, a log-off request to the network to deregister the second electronic device from the network, wherein deregistering the second electronic device causes the second electronic device to re-register with the network.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
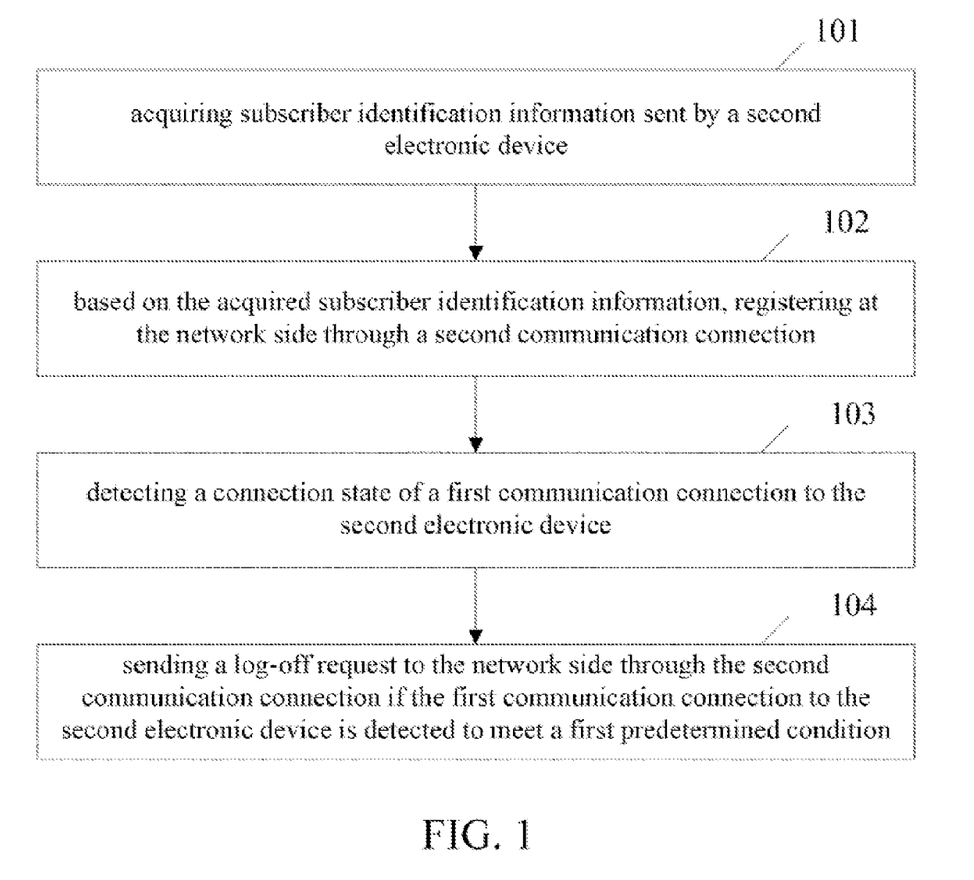
FIG. 1 is a control method according to an embodiment.

An embodiment provides a control method to be applied to a first electronic device, as shown in FIG. 1. The method includes, at 101, acquiring subscriber identification information sent by a second electronic device, wherein the subscriber identification information is identification information registered by the second electronic device at a network side. The method includes, at 102, based on the acquired subscriber identification information, registering at the network side through a second communication connection. The method includes, at 103, detecting a connection state of a first communication connection to the second electronic device. The method includes, at 104, if the first communication connection to the second electronic device is detected to meet a first predetermined condition, sending a log-off request to the network side through the second communication connection to enable the second electronic device to perform a registration operation based on the subscriber identification information.

In an embodiment, the first electronic device may be a mobile phone, and the second electronic device may be a smart watch. The second electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity.

At 101, in an embodiment, the subscriber identification information sent by the second electronic device is acquired through a wireless connection that may be a BLUETOOTH connection.

At 102, in an embodiment, the step of registering at the network side through a second communication connection based on the acquired subscriber identification information may include sending a registration request containing the subscriber identification information after the subscriber identification information is acquired by the first electronic device and registering at the network side, such as in a mobile communication network. Preferably, the registration request may further include a device identification of the first electronic device, such that the device identification of the first electronic device is associated with the subscriber identification information at the network side.

It can be understood that the second electronic device can be logged-off at the network side when the first electronic device registers at the network side based on the subscriber identification information; namely, subscriber identification information can be associated with only one electronic device at the network side at a time.

At 103, in an embodiment, in the step of detecting a connection state of a first communication connection to the second electronic device, the first communication connection may be a communication connection between the first electronic device and the second electronic device established through a first communication function, or a communication connection between the first electronic device and the second electronic device established through a first service. In an embodiment, the first communication function may be provided by a function unit having a wireless communication function. In an embodiment, the wireless communication function may be functions such as BLUETOOTH, Near Field Communication (NFC), WIFI, etc. In an embodiment, the first service may be a virtual SIM card function installed in the first electronic device.

Figure 2:
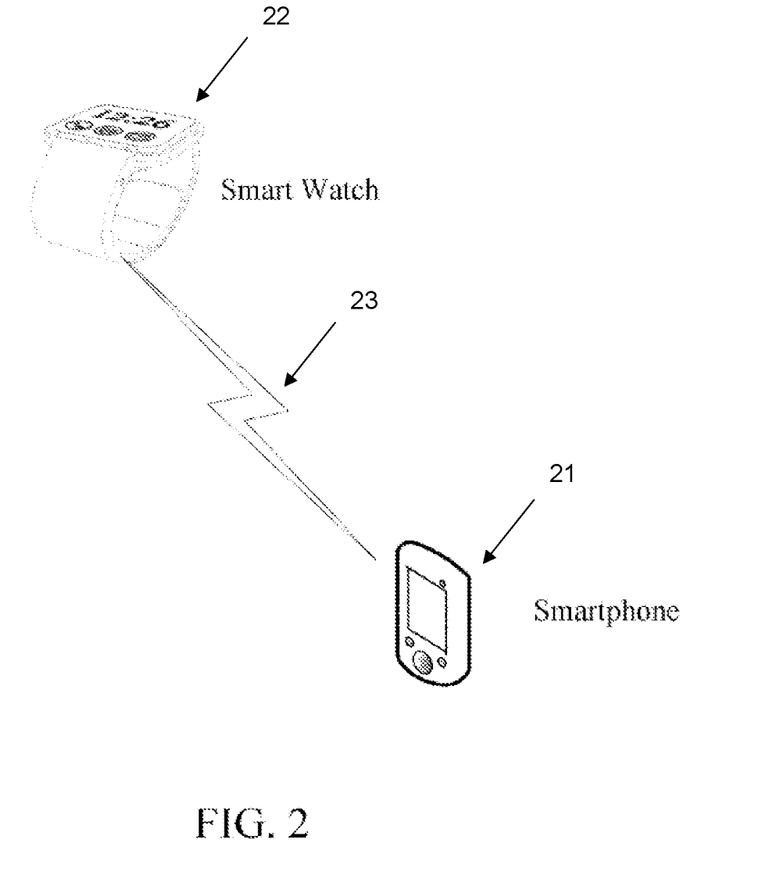
FIG. 2 is a schematic diagram of a scenario in accordance with an embodiment.

In the following, an embodiment is described in detail by using an example in which the first communication connection is a communication connection between the first electronic device and the second electronic device established through a first communication function. The first communication function may be assumed to be a BLUETOOTH function. For example, as shown in FIG. 2, the first electronic device 21 is a smart phone, the second electronic device is a smart watch 22, and the first communication connection 23 is established between them through BLUETOOTH. When the first communication connection 23 is a communication connection between the first electronic device 21 and the second electronic device 22 established through the first communication function, at 103, in an embodiment, the step of detecting a connection state of a first communication connection 23 to the second electronic device 22 includes acquiring a list of connection targets of the first communication connection 23; identifying whether the list of the connection targets includes the second electronic device 22; if the list of the connection targets includes the second electronic device 22, determining that the first communication connection 23 to the second electronic device 22 does not meet the first predetermined condition; and if the list of the connection targets does not include the second electronic device 22, determining that the first communication connection 23 to the second electronic device 22 meets the first predetermined condition.

In an embodiment, the list of the connection targets of the first communication connection 23 may include the information corresponding to all electronic devices interacting through the first communication connection 23 and acquired and recorded when the first electronic device 21 opens the first communication connection 23. The number of all of the electronic devices in an embodiment is not limited, and may be one or multiple. The information of the electronic device may be a name set by a user for the electronic device, e.g., "A's mobile phone".

Additionally, in an embodiment, if the first communication connection 23 is a BLUETOOTH connection, the situations wherein the first communication connection 23 does not meet the first predetermined condition may be caused by a distance between the first electronic device 21 and the second electronic 22 device exceeding the range covered by a BLUETOOTH connection, or a signal interference between the first electronic device 21 and the second electronic device 22.

The log-off request sent may include the subscriber identification information therein; correspondingly, the corresponding registration information may be found according to the received subscriber identification information at the network side, and in turn the log-off operation is completed according to the registration information.

By employing the abovementioned method, when the first electronic device 21 establishes the first communication connection 23 to the second electronic device 22, the first electronic device 21 can acquire the subscriber identification information and register at the network side to acquire a message that is sent from the network side and is corresponding to the subscriber identity information. Furthermore, when the first electronic device 21 detects that the first communication connection 23 to the second electronic device 22 meets the first predetermined condition, a log-off operation is controlled to be performed, such that the second electronic device 22 registers again based on the subscriber identification information, thereby guaranteeing that the second electronic device 22 can register at the network side in a timely manner when the user is away from the first electronic device 21. In this way, the user can receive the data information sent from the network side in a timely manner and avoid missing reception of information, thus ensuring the quality of user experience when using an electronic device for receiving information from the network side.

In an embodiment, the first electronic device may be a mobile phone, and the second electronic device may be a smart watch.

The second electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity.

In an embodiment, the subscriber identification information sent from the second electronic device is acquired through a wireless connection that may be a BLUETOOTH connection.

The step of registering at the network side through a second communication connection based on the acquired subscriber identification information may include sending a registration request containing the subscriber identification information after the subscriber identification information is acquired by the first electronic device and registering at the network side, such as in a mobile communication network. In an embodiment, the registration request may further include a device identification of the first electronic device, such that the device identification of the first electronic device is associated with the subscriber identification information at the network side.

It can be understood that the second electronic device can be logged-off at the network side when the first electronic device registers at the network side based on the sub scriber identification information, namely, sub scriber identification information can be associated with only one electronic device at the network side at a time.

In the step of detecting a connection state of a first communication connection to the second electronic device, the first communication connection may be a communication connection between the first electronic device and the second electronic device established through a first communication function, or a communication connection between the first electronic device and the second electronic device established through a first service. The first communication function may be provided by a function unit having a wireless communication function. The wireless communication function may be functions such as BLUETOOTH, NFC, WIFI, etc. The first service may be a virtual SIM card function installed in the first electronic device.

The operation of detecting a connection state of a first communication connection to the second electronic device may include the following two operation options.

Option 1

A request message is sent to the second electronic device. If no feedback message for the request message is received through the first communication connection within a predetermined time duration, then the first communication connection to the second electronic device meets the first predetermined condition. The request message may be an attempt message that is sent by the first electronic device to the second electronic device to request to establish a connection. The predetermined time duration may be a time set according to the actual situation, e.g., set as 1 minute; namely, the first electronic device attempts to establish a connection to the second electronic device.

The operation of sending a request message to the second electronic device may be sending the request message to the second electronic device through the first communication function. Additionally, the operation of sending a request message may be performed periodically, e.g., every 1 second, or the operation of sending a request message to the second electronic device may be triggered when connecting to the second electronic device through the first communication function fails.

Alternatively, the operation of sending a request message to the second electronic device may also be sending the request message to the second electronic device through the first service. Additionally, the operation of sending a request message may be performed periodically, e.g., every 1 second, or the operation of sending a request message to the second electronic device may be triggered when connecting to the second electronic device through the first service fails.

Option 2

A predetermined number of request messages are sent to the second electronic device within a predetermined time duration. If no feedback message for the predetermined number of the request messages is received through the first communication connection, then the first communication connection to the second electronic device meets the first predetermined condition. The predetermined time duration and the predetermined number of the request messages may include number information set according to the actual situation, e.g., the predetermined time duration may be 1 minute, and the predetermined number may be 10 or 5.

In situations where no feedback message for the predetermined number of the request messages is received through the first communication connection may be that no corresponding feedback message is received for any of the sent request messages. For example, if 5 request messages are sent and 1 feedback message is received, then the first communication connection does not meet the first predetermined condition. However, if 5 request messages are sent and not a single feedback message is received, then the first communication connection is determined to meet the first predetermined condition.

Furthermore, the predetermined number of the request messages may be sent in a way that a following request message is sent with a delay of the predetermined time duration after the sending of the previous request message. For example, after sending each of the request messages, the next request message is sent following a 5-second delay. Additionally, the manner of triggering the detection operation is the same as that in Option 1, and thus not further described here.

Preferably, prior to sending the log-off request to the network side through the second communication connection, the present embodiment may further include: starting a timer and performing the sending of the log-off request to the network side through the second communication connection when the time duration on the timer reaches a predetermined threshold value. In that manner, repeated activation of the VSIM function (and consequently the repeated switching of states between registered and de-registered at the network side) caused by a signal instability can be avoided, thereby saving power consumption and avoiding penalty on the SIM card by base stations. The effect of BLUETOOTH communication instability on the VSIM function is decreased.

The second communication connection may be a communication connection accessing a mobile communication network through a second communication function. The second communication function is provided with a mobile communication function. Additionally, in an embodiment, if the first communication connection is a BLUETOOTH connection, the situations wherein the first communication connection does not meet the first predetermined condition may be caused by a distance between the first electronic device and the second electronic device exceeding the range covered by a BLUETOOTH connection a signal interference between the first electronic device and the second electronic device.

The log-off request sent may include the subscriber identification information. The corresponding registration information may be found according to the received subscriber identification information at the network side, and in turn the log-off operation is completed according to the registration information.

In an embodiment, the method further includes, after the step of sending a log-off request to the network side, a step of periodically detecting whether the connection state of the first communication connection meets the first predetermined condition. If the connection state of the first communication connection does not meet the first predetermined condition, the method includes acquiring, based on the first communication connection, the subscriber identification information registered by the second electronic device at the network side. Namely, the state of whether the first communication connection to the second electronic device can be established is constantly being detected, for example, through a VSIM function, or a BLUETOOTH function.

Figure 3:
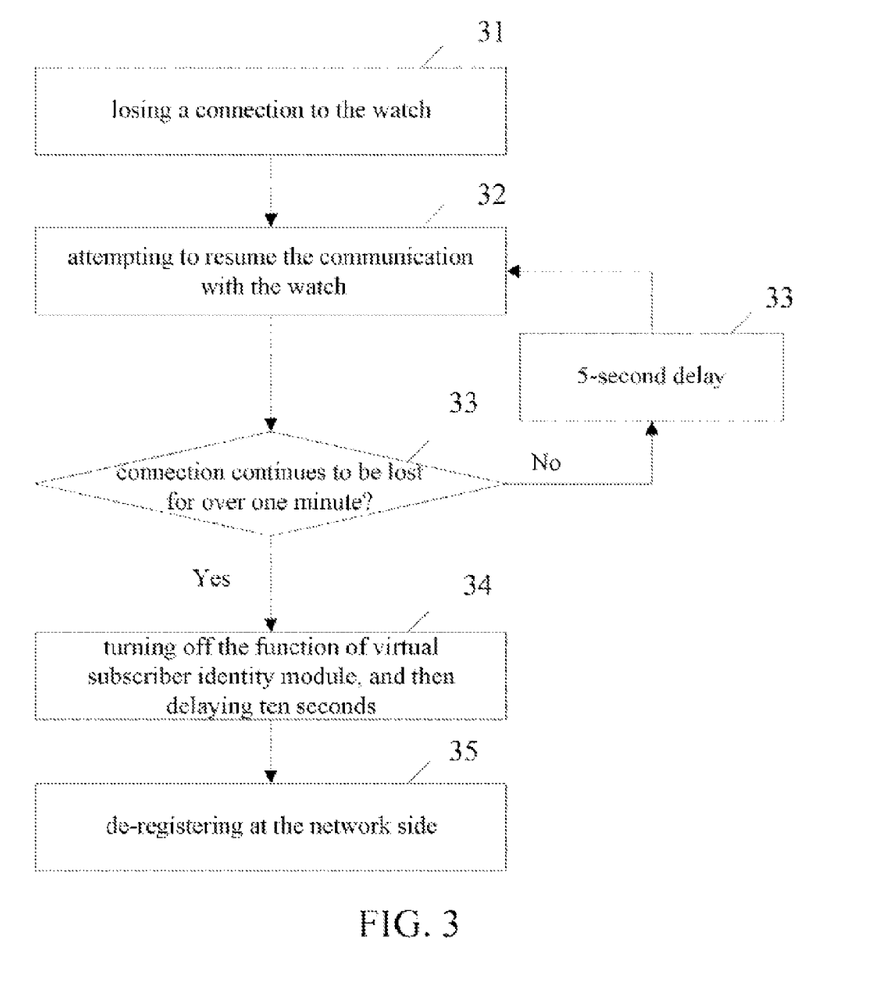
FIG. 3 is a schematic flow chart 1 of a process flow of a control method in accordance with an embodiment.
Figure 4:
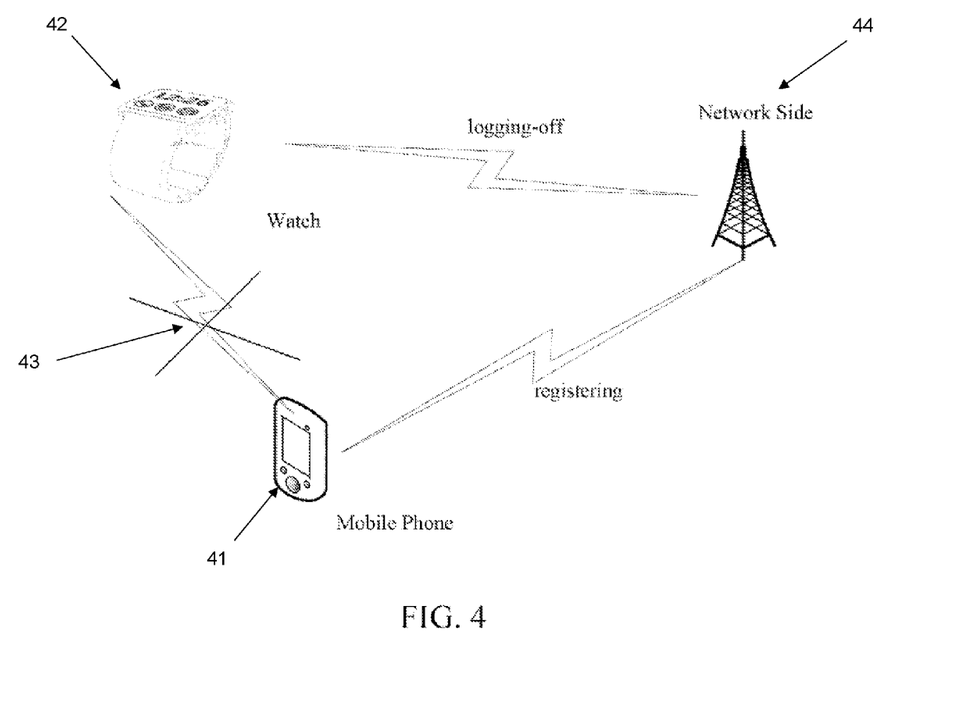
FIG. 4 is a schematic diagram of a scenario in accordance with an embodiment.

The following further describes the method provided with an embodiment in connection with FIG. 3 (assuming that the first electronic device is a mobile phone, and the second electronic device is a mobile phone smart watch). Reference is made to FIG. 4 for their operational relationship. The method specifically includes, at 31, losing a connection 43 to the watch 42 by the mobile phone 41. At 32, an embodiment attempts to resume communication with the watch 42 through BLUETOOTH by the mobile phone 41 (e.g., by sending a request message for attempting to connect through BLUETOOTH). At 33, an embodiment determines whether the current time duration of connection loss is over one minute. If it is not, then an embodiment returns to 32 after a 5-second delay. If the connection loss is over one minute, then an embodiment may proceed to 34. At 34, an embodiment turns off the function of virtual subscriber identity module (VSIM), and then delay 10 seconds. At 35, an embodiment sends a log-off request to de-register at the network side.

By employing the abovementioned method, when the first electronic device 41 establishes the first communication connection 43 to the second electronic device 42, the first electronic device 41 can acquire the subscriber identification information and register at the network side 44 to acquire a message that is sent from the network side 44 and is corresponding to the subscriber identity information. Furthermore, when the first electronic device 41 detects that the first communication connection 43 to the second electronic device 42 meets the first predetermined condition, a log-off operation is controlled to be performed, such that the second electronic device registers again based on the subscriber identification information, thereby guaranteeing that the second electronic device 42 can register at the network side 44 in a timely manner when the user is away from the first electronic device 41. In this way, the user can receive the data information sent from the network side 44 in a timely manner and avoid missing reception of information. This ensures the quality of the user experience when using an electronic device for receiving information from the network side 44.

Figure 5:
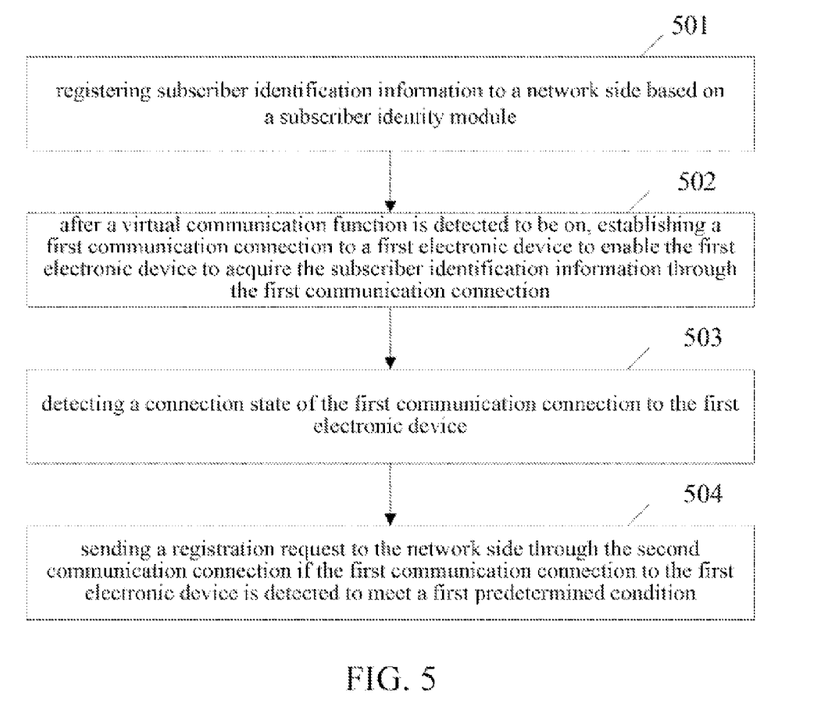
FIG. 5 is a schematic flow chart of a control method in accordance with an embodiment.

An embodiment of the present disclosure provides a control method to be applied to a second electronic device, as illustrated in FIG. 5. The method includes at 501, registering subscriber identification information to a network side based on a subscriber identity module. At 502, after a virtual communication function is detected to be on, an embodiment establishes a first communication connection to a first electronic device to enable the first electronic device to acquire the subscriber identification information through the first communication connection. At 503, an embodiment detects a connection state of the first communication connection to the first electronic device. At 504, if the first communication connection to the first electronic device is detected to meet a first predetermined condition, an embodiment sends a registration request to the network side through a second communication connection to enable a registration operation to be performed, at the network side, for the second electronic device based on the subscriber identification information.

At 501, in an embodiment, the first electronic device may be a mobile phone, and the second electronic device may be a smart watch. The second electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity. In an embodiment, the subscriber identification information sent from the second electronic device is acquired through a wireless connection that may be a BLUETOOTH connection.

At 502, the step of establishing a first communication connection to a first electronic device to enable the first electronic device to acquire the subscriber identification information through the first communication connection may include: turning on a function of virtual subscriber identity module (e.g., a VSIM function); then establishing the first communication connection to the first electronic device through a first communication function, and then sending the subscriber identification information obtained by registering at the network side to the first electronic device through the first communication connection by the second electronic device. Correspondingly, the first electronic device sends, after the subscriber identification information is acquired, a registration request containing the subscriber identification information to the network side (such as a mobile communication network) in order to register. In an embodiment, the registration request may further include a device identification of the first electronic device, such that the device identification of the first electronic device is associated with the subscriber identification information at the network side.

It can be understood that the second electronic device can be logged-off at the network side when the first electronic device registers at the network side based on the subscriber identification information; namely, a subscriber identification information can be associated with only one electronic device at the network side at a time.

At 503, in an embodiment, in the step of detecting a connection state of a first communication connection to the first electronic device, the first communication connection may be a communication connection between the first electronic device and the second electronic device. In an embodiment, the connection may be established through a first communication function, or a communication connection between the first electronic device and the second electronic device established through a first service. In an embodiment, the first communication function may be provided by a function unit having a wireless communication function. In an embodiment, the wireless communication function may be functions such as BLUETOOTH, NFC, WIFI, etc. In an embodiment, the first service may be a VSIM card function installed in the first electronic device.

In the following, the present embodiment is described in detail by using an example in which the first communication connection is a communication connection between the first electronic device and the second electronic device established through a first communication function. The first communication function may be assumed to be a BLUETOOTH function. For example, as shown in FIG. 2, the first electronic device 21 is a smart phone, the second electronic device 22 is a smart watch, and the first communication connection 23 is established between them through BLUETOOTH.

The step of detecting a connection state of a first communication connection to the first electronic device may include the following two operation options.

In an embodiment, a request message is sent to the first electronic device 21. If no feedback message for the request message is received through the first communication connection 23 within a predetermined time duration, then the first communication connection 23 to the first electronic device 21 meets the first predetermined condition. The request message may be an attempt message sent to the second electronic device 22 to request to establish a connection. The predetermined time duration may be a time set according to the actual situation, e.g., set as 1 minute; namely, the first electronic device 21 attempts to establish a connection 23 to the second electronic device 22.

In an embodiment, the operation of sending a request message may be sending the request message to the second electronic device 22 through the first communication function. Additionally, the operation of sending a request message may be performed periodically, e.g., every 1 second, or the operation of sending a request message may be triggered when connecting to the first electronic device 21 through the first communication function fails. Alternatively, in an embodiment, the operation of sending a request message may also be sending the request message through the first service. Additionally, in an embodiment, the operation of sending a request message may be performed periodically, e.g., every 1 second, or the operation of sending a request message to the first electronic device 21 through the first service may be triggered when connecting to the first electronic device 21 through the first service fails.

In an embodiment, a predetermined number of request messages are sent to the first electronic device 21 within a predetermined time duration. If no feedback message for the predetermined number of the request messages is received through the first communication connection 23, then the first communication connection 23 to the first electronic device 21 meets the first predetermined condition. The predetermined time duration and the predetermined number of the request messages may include number information set according to the actual situation, e.g., the predetermined time duration may be 1 minute, and the predetermined number may be 10 or 5.

In situations where no feedback message for the predetermined number of the request messages is received through the first communication connection 23 may be because no corresponding feedback message is received for any of the sent request messages. For example, if 5 request messages are sent and 1 feedback message is received, then the first communication connection 23 does not meet the first predetermined condition. However, if 5 request messages are sent and not a single feedback message is received, then the first communication connection 23 is determined to meet the first predetermined condition.

Furthermore, in an embodiment, the predetermined number of the request messages may be sent in a way in which a request message is sent with a delay of a predetermined time duration after the sending of the previous request message. For example, after sending each of the request messages, the next request message is sent following a 5-second delay. Additionally, the manner of triggering the detection operation is the same as that in Option 1, and thus not further described here.

In an embodiment, prior to sending the registration request to the network side through the second communication connection, the present embodiment may further include: starting a timer, and performing the sending of the registration request to the network side through the second communication connection when the time duration on the timer reaches a predetermined threshold value. The predetermined threshold value can be set according to actual situations, e.g., as 10 seconds. In that manner, repeated activation of the VSIM function (and consequently the repeated switching of states between registered and de-registered at the network side) caused by a signal instability can be avoided, thereby saving power consumption and avoiding penalty on the SIM card by base stations. The effect of BLUETOOTH communication instability on the VSIM function is decreased.

In an embodiment, the second communication connection may be a communication connection accessing a mobile communication network through a second communication function. The second communication function is provided with a mobile communication function. Additionally, in an embodiment, if the first communication connection 23 is a BLUETOOTH connection, the situations wherein the first communication connection 23 does not meet the first predetermined condition may be caused by a distance between the first electronic device 21 and the second electronic device 22 exceeding the range covered by a BLUETOOTH connection, or a signal interference between the first electronic device 21 and the second electronic device 22.

The log-off request sent may include the subscriber identification information therein; correspondingly, the corresponding registration information may be found according to the received subscriber identification information at the network side, and in turn the log-off operation is completed according to the registration information.

Figure 6:
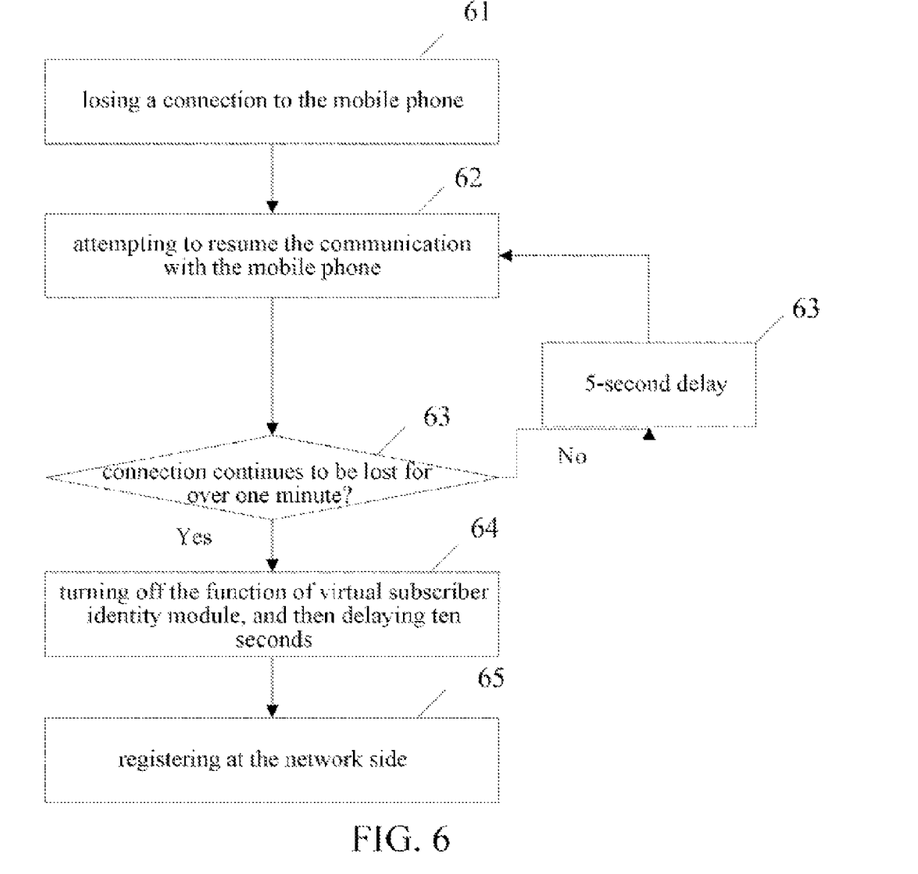
FIG. 6 is a schematic flow chart of a control method in accordance with an embodiment.

The following further describes the method provided with the present embodiment in connection with FIG. 6 (assuming that the first electronic device is a mobile phone, and the second electronic device is a mobile phone smart watch. Reference is made to FIG. 4 for their operational relationship). The method specifically includes, at 61 losing a connection 43 to the watch 42 by the mobile phone 41. At 62, an embodiment attempts to resume communication with the mobile phone 41 through BLUETOOTH by the watch 42 (e.g., by sending a request message for attempting to connect through BLUETOOTH, or by attempting to resume communication with the mobile phone 41 through a VSIM function). At 63, an embodiment determines whether the current time duration of connection loss is over 1 minute: if no, going back to 62, after a 5-second delay; if yes, proceeding to 64.

At 64, an embodiment turns off the function of virtual subscriber identity module (VSIM), and then delays 10 seconds. At 65, an embodiment sends a registration request to register at the network side.

By employing the abovementioned method, when the first electronic device establishes the first communication connection to the second electronic device, the first electronic device can acquire the subscriber identification information and register at the network side to acquire a message that is sent from the network side and is corresponding to the subscriber identity information. Furthermore, when the first electronic device detects that the first communication connection to the second electronic device meets the first predetermined condition, a log-off operation is controlled to be performed, such that the second electronic device registers again based on the subscriber identification information, thereby guaranteeing that the second electronic device can register at the network side in a timely manner when the user is away from the first electronic device. In this way, the user can receive the data information sent from the network side in a timely manner and avoid missing reception of information. This ensures the quality of the user experience when using an electronic device for receiving information from the network side.

Figure 7:
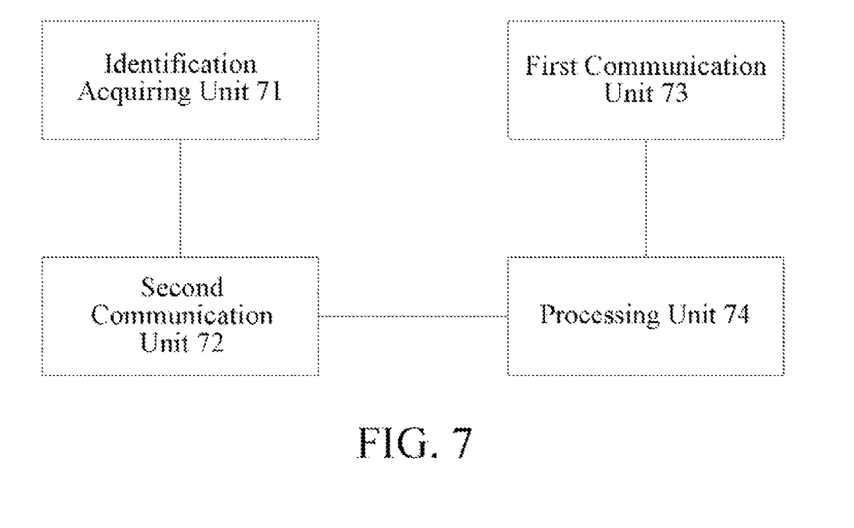
FIG. 7 is a structural schematic diagram of components of an electronic device in accordance with an embodiment.

An embodiment of the present disclosure provides an electronic device, as illustrated in FIG. 7. In an embodiment, the device include an identification acquiring unit 71 configured to acquire subscriber identification information sent by a second electronic device. In an embodiment, the subscriber identification information is identification information registered by the second electronic device at a network side. In an embodiment, the device include a second communication unit 72 configured to register, based on the acquired subscriber identification information, at the network side through a second communication connection. In an embodiment, the device may include a first communication unit 73 configured to detect a connection state of a first communication connection to the second electronic device. In an embodiment, the device include a processing unit 74 configured to send a log-off request to the network side through the second communication connection if the first communication connection to the second electronic device is detected to meet a first predetermined condition.

In an embodiment, the first electronic device may be a mobile phone, and the second electronic device may be a smart watch. The second electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity. In an embodiment, the subscriber identification information sent from the second electronic device is acquired through a wireless connection that may be a BLUETOOTH connection.

The step of registering at the network side through a second communication connection based on the acquired subscriber identification information may include sending a registration request containing the subscriber identification information after the subscriber identification information is acquired by the first electronic device and registering at the network side, such as in a mobile communication network. In an embodiment, the registration request may further include a device identification of the first electronic device, such that the device identification of the first electronic device is associated with the subscriber identification information at the network side.

It can be understood that the second electronic device can be logged-off at the network side when the first electronic device registers at the network side based on the subscriber identification information; namely, a subscriber identification information can be associated with only one electronic device at the network side at a time.

In an embodiment, the first communication unit 73 is specifically configured to establish the first communication connection to the second electronic device through a first communication function. In an embodiment, the first communication unit 73 is specifically configured to establish a communication connection to the second electronic device through a first service.

In an embodiment, the first communication function may be provided by a function unit having a wireless communication function. The wireless communication function may be functions such as BLUETOOTH, NFC, WIFI, etc. The first service may be a virtual SIM card function installed in the first electronic device.

In the following, an embodiment is described in detail by using an example in which the first communication connection is a communication connection between the first electronic device and the second electronic device established through a first communication function. The first communication function may be assumed to be a BLUETOOTH function. For example, as shown in FIG. 2, the first electronic device 21 is a smart phone, the second electronic device 22 is a smart watch, and the first communication connection 23 is established between them through BLUETOOTH.

In an embodiment, the processing unit 74 is specifically configured to acquire a list of connection targets of the first communication connection 23 when the first communication unit 73 establishes the first communication connection 23 to the second electronic device 22 through the first communication function, to identify whether the list of the connection targets includes the second electronic device, to determine that the first communication connection 23 to the second electronic device 22 does not meet the first predetermined condition if the list of the connection targets includes the second electronic device, and to determine that the first communication connection 23 to the second electronic device 22 meets the first predetermined condition if the list of the connection targets does not include the second electronic device 22.

The list of the connection targets of the first communication connection 23 may include the information corresponding to all electronic devices interacting through the first communication connection 23 and acquired and recorded when the first electronic device 21 opens the first communication connection 23. The number of all of the electronic devices in the present embodiment is not limited, and may be one or multiple. The information of the electronic device may be a name set by a user for the electronic device, e.g., "A's mobile phone".

Additionally, in an embodiment, if the first communication connection 23 is a BLUETOOTH connection, the situations wherein the first communication connection 23 does not meet the first predetermined condition may be caused by a distance between the first electronic device 21 and the second electronic device 22 exceeding the range covered by a BLUETOOTH connection, or a signal interference between the first electronic device 21 and the second electronic device 22.

By employing the abovementioned method, when the first electronic device 21 establishes the first communication connection 23 to the second electronic device 22, the first electronic device 21 can acquire the subscriber identification information and register at the network side to acquire a message that is sent from the network side and is corresponding to the subscriber identity information. Furthermore, when the first electronic device 21 detects that the first communication connection 23 to the second electronic device 22 meets the first predetermined condition, a log-off operation is controlled to be performed, such that the second electronic device 22 registers again based on the subscriber identification information, thereby guaranteeing that the second electronic device 22 can register at the network side in a timely manner when the user is away from the first electronic device 21. In this way, the user can receive the data information sent from the network side in a timely manner and avoid missing reception of information. This ensures the quality of the user experience when using an electronic device for receiving information from the network side.

An embodiment of the present application provides an electronic device, as illustrated in FIG. 7. In an embodiment, the device may include an identification acquiring unit 71 configured to acquire subscriber identification information sent by a second electronic device. In an embodiment, the subscriber identification information is identification information registered by the second electronic device at a network side. In an embodiment, the device include a second communication unit 72 configured to register, based on the acquired subscriber identification information, at the network side through a second communication connection. In an embodiment, the device includes a first communication unit 73 configured to detect a connection state of a first communication connection to the second electronic device. In an embodiment, a device includes a processing unit 74 configured to send a log-off request to the network side through the second communication connection if the first communication connection to the second electronic device is detected to meet a first predetermined condition.

In an embodiment, the second electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity. In an embodiment, the subscriber identification information sent from the second electronic device is acquired through a wireless connection that may be a BLUETOOTH connection.

The step of registering at the network side through a second communication connection based on the acquired subscriber identification information may include sending a registration request containing the subscriber identification information after the subscriber identification information is acquired by the first electronic device and registering at the network side, such as in a mobile communication network. In an embodiment, the registration request may further include a device identification of the first electronic device, such that the device identification of the first electronic device is associated with the subscriber identification information at the network side.

It can be understood that the second electronic device can be logged-off at the network side when the first electronic device registers at the network side based on the subscriber identification information; namely, a subscriber identification information can be associated with only one electronic device at the network side at a time.

In an embodiment, the first communication unit 73 is specifically configured to establish the first communication connection to the second electronic device through a first communication function. In an embodiment, the first communication unit 73 is specifically configured to establish a communication connection to the second electronic device through a first service.

In an embodiment, the first communication function may be provided by a function unit having a wireless communication function. The wireless communication function may be functions such as BLUETOOTH, NFC, WIFI, etc. The first service may be a virtual SIM card function installed in the first electronic device.

The operation of detecting a connection state of a first communication connection to the second electronic device may include the following two operation options.

Regarding Option 1, in an embodiment, the processing unit 74 is specifically configured to control a sending of a request message to the second electronic device. If no feedback message for the request message is received through the first communication connection of the first communication unit within a predetermined time duration, then the first communication connection to the second electronic device meets the first predetermined condition. The request message may be an attempt message that is sent by the first electronic device to the second electronic device to request to establish a connection. The predetermined time duration may be a time set according to the actual situation, e.g., set as 1 minute; namely, the first electronic device attempts to establish a connection to the second electronic device.

In an embodiment, the processing unit 74 is specifically configured to send the request message to the second electronic device through a first communication function. Additionally, in an embodiment, the operation of sending a request message may be performed periodically, e.g., every 1 second, or the operation of sending a request message to the second electronic device may be triggered when connecting to the second electronic device through the first communication function fails. Alternatively, in an embodiment, the processing unit is specifically configured to send the request message to the second electronic device through a first service. Additionally, in an embodiment, the operation of sending a request message may be performed periodically, e.g., every 1 second, or the operation of sending a request message to the second electronic device may be triggered when connecting to the second electronic device through the first service fails.

Regarding Option 2, in an embodiment, the processing unit 74 is specifically configured to send a predetermined number of request messages to the second electronic device within a predetermined time duration. If no feedback message for the predetermined number of the request messages is received through the first communication connection of the first communication unit, then the first communication connection to the second electronic device meets the first predetermined condition. The predetermined time duration and the predetermined number of the request messages may include number information set according to the actual situation, e.g., the predetermined time duration may be 1 minute, and the predetermined number may be 10 or 5.

In situations wherein no feedback message for the predetermined number of the request messages is received through the first communication connection may be that no corresponding feedback message is received for any of the sent request messages. For example, if 5 request messages are sent and 1 feedback message is received, then the first communication connection does not meet the first predetermined condition. However, if 5 request messages are sent and not a single feedback message is received, then the first communication connection is determined to meet the first predetermined condition.

Furthermore, in an embodiment, the predetermined number of the request messages may be sent in a way that a following request message is sent with a delay of the predetermined time duration after the sending of the previous request message. For example, after sending each of the request messages, the next request message is sent following a 5-second delay. Additionally, the manner of triggering the detection operation is the same as that in Option 1, and thus not further described here.

In an embodiment, the processing unit 74 may be further configured to start a timer and to perform the sending of the log-off request to the network side through the second communication connection when the time duration on the timer reaches a predetermined threshold value. In that manner, repeated activation of the VSIM function (and consequently the repeated switching of states between registered and de-registered at the network side) caused by a signal instability can be avoided, thereby saving power consumption and avoiding penalty on the SIM card by base stations. The effect of BLUETOOTH communication instability on the VSIM function is decreased.

In an embodiment, the second communication connection may be a communication connection accessing a mobile communication network through a second communication function. The second communication function is provided with a mobile communication function. Additionally, in an embodiment, if the first communication connection is a BLUETOOTH connection, the situations wherein the first communication connection does not meet the first predetermined condition may be caused by a distance between the first electronic device and the second electronic device exceeding the range covered by a BLUETOOTH connection, or a signal interference between the first electronic device and the second electronic device.

In an embodiment, the log-off request sent may include the subscriber identification information. The corresponding registration information may be found according to the received subscriber identification information at the network side, and in turn the log-off operation is completed according to the registration information. In an embodiment, after sending the log-off request to the network side, the processing unit 74 is further configured to periodically detect whether the connection state of the first communication connection meets the first predetermined condition. If the connection state of the first communication connection does not meet the first predetermined condition, then an embodiment acquires, based on the first communication connection of the first communication unit 73, the subscriber identification information registered by the second electronic device at the network side. Namely, the state of whether the first communication connection to the second electronic device can be established is constantly being detected, for example through a VSIM function, or a BLUETOOTH function.

By employing the abovementioned method, when the first electronic device establishes the first communication connection to the second electronic device, the first electronic device can acquire the subscriber identification information and register at the network side to acquire a message that is sent from the network side and is corresponding to the subscriber identity information. Furthermore, when the first electronic device detects that the first communication connection to the second electronic device meets the first predetermined condition, a log-off operation is controlled to be performed, such that the second electronic device registers again based on the subscriber identification information, thereby guaranteeing that the second electronic device can register at the network side in a timely manner when the user is away from the first electronic device. In this way, the user can receive the data information sent from the network side in a timely manner and avoid missing reception of information. This ensures the quality of the user experience when using an electronic device for receiving information from the network side.

Figure 8:
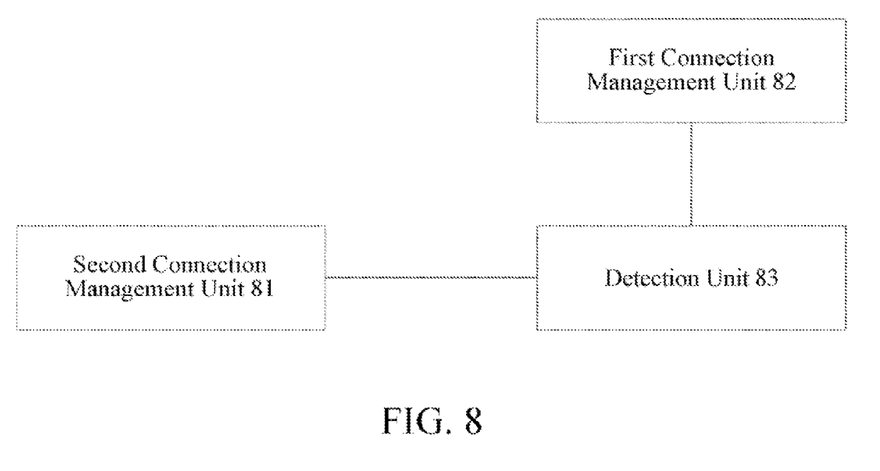
FIG. 8 is a structural schematic diagram of components of an electronic device in accordance with an embodiment.

An embodiment of the present application provides an electronic device, as illustrated in FIG. 8. In an embodiment, the electronic device may include a second connection management unit 81 configured to register subscriber identification information to a network side based on a subscriber identity module and to send a registration request to the network side through a second communication connection. In an embodiment, the electronic device includes a first connection management unit 82 configured to establish a first communication connection to a first electronic device to enable the first electronic device to acquire the subscriber identification information through the first communication connection. In an embodiment, the electronic device includes a detection unit 83 configured to detect a connection state of the first communication connection to the first electronic device. In an embodiment, the detection unit 83 sends a registration request to the network side through the second communication connection if the first communication connection to the first electronic device is detected to meet a first predetermined condition.

In an embodiment, the electronic device is installed with a Subscriber Identity Module (SIM), and the second electronic device can acquire corresponding subscriber identification information based on the SIM. The subscriber identification information is subscriber identification information that is obtained by registering on the network side (e.g., a mobile communication network) after installation of the SIM on the second electronic device and is used at the network side to identify the subscriber's identity. In an embodiment, the subscriber identification information sent from the second electronic device is acquired through a wireless connection that may be a BLUETOOTH connection.

The step of establishing a first communication connection to a first electronic device to enable the first electronic device to acquire the subscriber identification information through the first communication connection may include: turning on a function of virtual subscriber identity module (e.g., a VSIM function); then establishing the first communication connection to the first electronic device through a first communication function, and then sending the subscriber identification information obtained by registering at the network side to the first electronic device through the first communication connection, by the second electronic device. Correspondingly, the first electronic device sends, after the subscriber identification information is acquired, a registration request containing the subscriber identification information in order to register at the network side (such as a mobile communication network). In an embodiment, the registration request may further include a device identification of the first electronic device, such that the device identification of the first electronic device is associated with the subscriber identification information at the network side.

It can be understood that the second electronic device can be logged-off at the network side when the first electronic device registers at the network side based on the subscriber identification information; namely, a subscriber identification information can be associated with only one electronic device at the network side at a time.

In the following, the present embodiment is described in detail by using an example in which the first communication connection is a communication connection between the first electronic device and the second electronic device established through a first communication function. The first communication function may be assumed to be a BLUETOOTH function. For example, as shown in FIG. 2, the first electronic device 21 is a smart phone, the second electronic device 22 is a smart watch, and the first communication connection 23 is established between them through BLUETOOTH.

The step of detecting a connection state of a first communication connection 23 to the first electronic device 21 may include the following two operation options.

In an embodiment, the detection unit 83 is configured to send a request message to the first electronic device 21. If no feedback message for the request message is received through the first communication connection 23 within a predetermined time duration, then the first communication connection 23 to the first electronic device 21 meets the first predetermined condition. The request message may be an attempt message sent to the second electronic device 22 to request to establish a connection. The predetermined time duration may be a time set according to the actual situation, e.g., set as 1 minute; namely, the first electronic device 21 attempts to establish a connection to the second electronic device 22.

In an embodiment, the operation of sending a request message may be sending the request message to the second electronic device 22 through the first communication function. Additionally, the operation of sending a request message may be performed periodically, e.g., every 1 second, or the operation of sending a request message may be triggered when connecting to the first electronic device 21 through the first communication function fails. Alternatively, in an embodiment, the operation of sending a request message may also be sending the request message through the first service. Additionally, in an embodiment, the operation of sending a request message may be performed periodically, e.g., every 1 second, or the operation of sending a request message to the first electronic device 21 through the first service may be triggered when connecting to the first electronic device 21 through the first service fails.

In an embodiment, the detection unit 83 is configured to send a predetermined number of request messages to the first electronic device 21 within a predetermined time duration. If no feedback message for the predetermined number of the request messages is received through the first communication connection 23, then the first communication connection 23 to the first electronic device 21 meets the first predetermined condition. The predetermined time duration and the predetermined number of the request messages may include number information set according to the actual situation, e.g., the predetermined time duration may be 1 minute, and the predetermined number may be 10 or 5.

In situations wherein no feedback message for the predetermined number of the request messages is received through the first communication connection 23 may be that no corresponding feedback message is received for any of the sent request messages. For example, if 5 request messages are sent and 1 feedback message is received, then the first communication connection 23 does not meet the first predetermined condition. However, if 5 request messages are sent and not a single feedback message is received, then the first communication connection 23 is determined to meet the first predetermined condition.

Furthermore, the predetermined number of the request messages may be sent in a way that a following request message is sent with a delay of the predetermined time duration after the sending of the previous request message. For example, after sending each of the request messages, the next request message is sent following a 5-second delay. Additionally, the manner of triggering the detection operation is the same as that in Option 1, and thus not further described here.

In an embodiment, the detection unit 83 may be configured to start a timer and to perform the sending of the registration request to the network side through the second communication connection when the time duration on the timer reaches a predetermined threshold value. The predetermined threshold value can be set according to actual situations, e.g., as 10 seconds. In that manner, repeated activation of the VSIM function (and consequently the repeated switching of states between registered and de-registered at the network side) caused by a signal instability can be avoided, thereby saving power consumption and avoiding penalty on the SIM card by base stations. The effect of BLUETOOTH communication instability on the VSIM function is decreased.

In an embodiment, the second communication connection may be a communication connection accessing a mobile communication network through a second communication function. The second communication function is provided with a mobile communication function. Additionally, in an embodiment, if the first communication connection is a BLUETOOTH connection, the situations wherein the first communication connection does not meet the first predetermined condition may be caused by a distance between the first electronic device 21 and the second electronic device 22 exceeding the range covered by a BLUETOOTH connection. In an embodiment, a signal interference between the first electronic device 21 and the second electronic device 22.

The log-off request sent may include the subscriber identification information therein. Correspondingly, the corresponding registration information may be found according to the received subscriber identification information at the network side, and in turn the log-off operation is completed according to the registration information.

By employing the abovementioned method, when the first electronic device 21 establishes the first communication connection to the second electronic device 22, the first electronic device 21 can acquire the subscriber identification information and register at the network side to acquire a message that is sent from the network side and is corresponding to the subscriber identity information. Furthermore, when the first electronic device 21 detects that the first communication connection 23 to the second electronic device 22 meets the first predetermined condition, a log-off operation is controlled to be performed, such that the second electronic device 22 registers again based on the subscriber identification information, thereby guaranteeing that the second electronic device 22 can register at the network side in a timely manner when the user is away from the first electronic device 21. In this way, the user can receive the data information sent from the network side in a timely manner and avoid missing reception of information. This ensures the quality of the user experience when using an electronic device for receiving information from the network side.

It should be understood that the devices disclosed in the embodiments of the present application may be implemented in other ways. The device embodiments as described above are only for illustration, and may be partially implemented in other manners. For example, some features may be omitted. Additionally, coupling, direct coupling, or communication connections among the component parts as shown or discussed may be implemented through some interface(s), and indirect coupling or communication connections of devices or units may be in an electrical, mechanical, or other form.

The units described above as separate components may be or may not be separated physically. The components illustrated as units may be or may not be physical units. The object of the present solution of the embodiments can be achieved by some or all of the units, according to actual requirements.

In the context of this document, a storage medium is not a signal and "non-transitory" includes all media except signal media.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. An electronic device, comprising:
a processor; and
a transceiver coupled to the processor, wherein the transceiver receives subscriber identification information from another electronic device through a first communication connection, and sends said subscriber identification information to a network in order to register the electronic device with the network, and
wherein, after detecting that the electronic device is no longer connected to the another electronic device through the first communication connection, the processor instructs the transceiver to send a log-off request to the network to deregister the electronic device from the network, so as to cause the another electronic device to re-register with the network when the first communication connection does not meet a first predetermined condition;
the processor periodically detects whether the first communication connection meets the first predetermined condition, and responsive to detecting that the first communication connection meets the first predetermined condition, the processor acquires the subscriber identification information registered by the another electronic device at the network side, wherein the detection of whether the first communication connection meets the first predetermined condition comprises identifying whether at least one feedback message is received from the another electronic device responsive to a request message sent by the electronic device.

2. The electronic device of claim 1, further comprising:
a first communication unit;
wherein the first communication unit establishes a first communication connection to the another electronic device through one of: a first communication function or a first service.

3. The electronic device of claim 2, wherein:
the processing unit acquires a list of connection targets of the first communication connection in response to the first communication unit establishing the first communication connection to the another electronic device through the first communication function, wherein in response to said processing unit determining that the list of the connection targets includes the another electronic device, said processing unit determines that the first communication connection to the another electronic device does not meet the first predetermined condition to re-register the another electronic device with the network, and, said processing unit determines that the first communication connection to the another electronic device meets the first predetermined condition to re-register the another electronic device with the network in response to the list of the connection targets not including the another electronic device.

4. The electronic device of claim 2, wherein:
the processing unit controls a sending of a request message to the another electronic device, and wherein, in response to no feedback message in response to the request message is received through the first communication connection of the first communication unit within a predetermined time duration, the first communication connection to the another electronic device meets the first predetermined condition to re-register the another electronic device with the network.

5. The electronic device of claim 2, wherein:
the processing unit sends a predetermined number of request messages to the another electronic device within a predetermined time duration, and wherein, in response to no feedback message being received through the first communication connection for the first communication unit for the predetermined number of the request messages, the first communication connection to the another electronic device meets the first predetermined condition to re-register the another electronic device with the network.

6. The electronic device of claim 1, wherein the electronic device is a mobile phone and the another electronic device is a smart watch.

7. A control method comprising:
connecting a first electronic device with a second electronic device to facilitate data transfer, wherein the second electronic device has registered subscriber identification information with a network;

receiving, at the first electronic device, said subscriber identification information from the second electronic device;

sending, through a first communication connection, said subscriber identification information to the network to register the first electronic device with the network; and in response to detecting that the second electronic device is no longer connected to the first electronic device through the first communication connection, sending a log-off request to the network to deregister the first electronic device from the network;

wherein deregistering the first electronic device causes the second electronic device to re-register with the network when the first communication connection does not meet a first predetermined condition;

the processor periodically detects whether the first communication connection meets the first predetermined condition, and responsive to detecting that the first communication connection meets the first predetermined condition, the processor acquires the subscriber identification information registered by the second electronic device at the network side, wherein the detection of whether the first communication connection meets the first predetermined condition comprises identifying whether at least one feedback message is received from the second electronic device responsive to a request message sent by the first electronic device.

8. The method of claim 7, wherein a first communication connection is a communication connection between the first electronic device and the second electronic device established through a first communication function.

9. The method of claim 7, wherein a first communication connection is a communication connection between the first electronic device and the second electronic device established through a first service.

10. The method of claim 8, wherein, the detecting that the second electronic device is no longer connected to the first electronic device comprises:

acquiring a list of connection targets of the first communication connection;

determining that the list of the connection targets includes the second electronic device;

in response to the list of the connection targets including the second electronic device, determining that the first communication connection to the second electronic device does not meet the first predetermined condition to re-register the second electronic device with the network; and in response to the list of the connection targets not including the second electronic device, determining that the first communication connection to the second electronic device meets the first predetermined condition to re-register the second electronic device with the network.

11. The method of claim 9, wherein, the detecting that the second electronic device is no longer connected to the first electronic device comprises:

acquiring a list of connection targets of the first communication connection;

determining that the list of the connection targets includes the second electronic device;

in response to the list of the connection targets including the second electronic device, determining that the first communication connection to the second electronic device does not meet the first predetermined condition to re-register the second electronic device with the network; and in response to the list of the connection targets not including the second electronic device, determining that the first communication connection to the second electronic device meets the first predetermined condition to re-register the second electronic device with the network.

12. The method of claim 7, wherein the detecting that the second electronic device is no longer connected to the first electronic device comprises:

sending a request message to the second electronic device, wherein if no feedback message in response to the request message is received within a predetermined time duration, determining a first predetermined condition to re-register the second electronic device with the network is established.

13. The method of claim 7, wherein the detecting that the second electronic device is no longer connected to the first electronic device comprises:

sending a predetermined number of request messages to the second electronic device within a predetermined time duration, wherein in response to no feedback message for the predetermined number of the request messages being received, determining a first predetermined condition to re-register the second electronic device with the network is established.

14. The method of claim 7, wherein the detecting that the second electronic device is no longer connected to the first electronic device comprises:

sending a request message from the first electronic device, wherein in response to no feedback message to the request message being received through a first communication connection between the first electronic device and the second electronic device within a predetermined time duration, determining that the first communication connection between the first electronic device and the second electronic device meets a predetermined condition for re-registering the second electronic device with the network side.

15. The method of claim 7, wherein the detecting that the second electronic device is no longer connected to the first electronic device comprises:

sending a predetermined number of request messages to the second electronic device within a predetermined time duration, wherein in response to no feedback message to the predetermined number of the request messages being received through a first communication connection between the first electronic device and the second electronic device, determining that the first communication connection meets a first predetermined condition for re-registering the second electronic device with the network side.

* * * * *